United States Patent
Li et al.

(10) Patent No.: US 10,277,263 B2
(45) Date of Patent: Apr. 30, 2019

(54) RADIO RECEIVER

(71) Applicants: NATIONAL INSTITUTE OF INFORMATION AND COMMUNICATIONS TECHNOLOGY, Koganei-shi, Tokyo (JP); GIT JAPAN INCORPORATED, Rittoh-shi, Shiga (JP)

(72) Inventors: Huan-Bang Li, Tokyo (JP); Ryu Miura, Tokyo (JP); Hisashi Nishikawa, Shiga (JP); Atsushi Osada, Shiga (JP)

(73) Assignees: NATIONAL INSTITUTE OF INFORMATION AND COMMUNICATIONS TECHNOLOGY, Tokyo (JP); GIT JAPAN INCORPORATED, Shiga (JP)

( * ) Notice: Subject to any disclaimer, the term of this patent is extended or adjusted under 35 U.S.C. 154(b) by 0 days.

(21) Appl. No.: 16/061,963

(22) PCT Filed: Dec. 12, 2016

(86) PCT No.: PCT/JP2016/086921
§ 371 (c)(1),
(2) Date: Jun. 13, 2018

(87) PCT Pub. No.: WO2017/104615
PCT Pub. Date: Jun. 22, 2017

(65) Prior Publication Data
US 2018/0367176 A1 Dec. 20, 2018

(30) Foreign Application Priority Data
Dec. 18, 2015 (JP) .................. 2015-246900

(51) Int. Cl.
*H04B 1/10* (2006.01)
*H04B 1/16* (2006.01)
(Continued)

(52) U.S. Cl.
CPC ............ *H04B 1/1036* (2013.01); *H04B 1/16* (2013.01); *H04B 1/7163* (2013.01);
(Continued)

(58) Field of Classification Search
CPC .... H04B 1/1036; H04B 7/08; H04B 1/71637; H04B 1/16; H04B 1/7163; H04L 7/08; H04L 1/203; H04L 25/063; H04L 27/06
(Continued)

(56) References Cited

U.S. PATENT DOCUMENTS

| | | | |
|---|---|---|---|
| 6,173,018 B1 | 1/2001 | Kuroki | |
| 2004/0131130 A1* | 7/2004 | Shor | H04B 1/71632 375/308 |

(Continued)

FOREIGN PATENT DOCUMENTS

| | | |
|---|---|---|
| JP | H10163877 A | 6/1998 |
| JP | 2000078211 A | 3/2000 |
| JP | 2015061105 A | 3/2015 |

OTHER PUBLICATIONS

International Search Report (ISR) dated Jan. 17, 2017 issued in International Application No. PCT/JP2016/086921.
(Continued)

*Primary Examiner* — Eugene Yun
(74) *Attorney, Agent, or Firm* — Holtz, Holtz & Volek PC

(57) ABSTRACT

A radio receiver, configured to use an impulse UWB, includes: a reception antenna which receives the impulse UWB, a reception unit which amplifies the received impulse UWB and detects an envelope of the impulse UWB, maximum-peak and minimum-peak detection units which detect a maximum value and minimum value of the envelope, respectively, a comparator which acquires signal data from the envelope with an initial threshold value, a baseband unit which measures an error rate of the signal data, an MPU
(Continued)

which calculates a correction value based on the error rate, and an arithmetic unit which calculates a corrected threshold value based on the maximum, minimum and correction values. The arithmetic unit transmits the corrected threshold value to the comparator. The comparator acquires the signal data from the envelope based on the corrected threshold value transmitted from the arithmetic unit.

20 Claims, 2 Drawing Sheets

(51) Int. Cl.
H04B 1/7163 (2011.01)
H04B 7/08 (2006.01)
H04L 1/20 (2006.01)
H04L 25/06 (2006.01)
H04L 27/06 (2006.01)

(52) U.S. Cl.
CPC ......... *H04B 1/71637* (2013.01); *H04B 7/08* (2013.01); *H04L 1/203* (2013.01); *H04L 25/063* (2013.01); *H04L 27/06* (2013.01)

(58) Field of Classification Search
USPC .......................................... 455/63.1
See application file for complete search history.

(56) References Cited

U.S. PATENT DOCUMENTS

2006/0039449 A1* 2/2006 Fontana ............ H04B 1/71635
375/130
2011/0142174 A1* 6/2011 Park ..................... H04B 1/7183
375/340

OTHER PUBLICATIONS

Written Opinion dated Jan. 17, 2017 issued in International Application No. PCT/JP2016/086921.
Qin Zhou et al., "A Flexible Back-end with Optimum Threshold Estimation for OOK Based Energy Detection IR-UWB Receivers," 2011 IEEE International Conference on Ultra-Wideband(ICUWB), Sep. 16, 2011, pp. 130-134.
Masaya Sasaki et al., "A Study on Multi-User Access in Energy Detection UWB-IR Receiver," Spread Spectrum Techniques and Applications (ISITA), 2010 IEEE 11th International Symposium, Oct. 20, 2010, pp. 141-146.

* cited by examiner ary that a UWB signal occupies is considerably wide over a range of 500 MHz to several GHz. As a result, high data-rate signal transmission or high-precision ranging is achieved because of use of a pulse signal having a considerably short time width of 1 nsec.

RADIO RECEIVER

TECHNICAL FIELD

The present invention relates to a radio receiver capable of improving receiving sensitivity while using an impulse-radio ultra wide band (IR-UWB).

BACKGROUND ART

A technology that uses an impulse-radio UWB and performs communication with a pulse having an extremely narrow time width, has been known as a recent noticeable radio communication technology (refer to Patent Literature 1).

In the impulse-radio UWB, a pulse signal having a considerably short time width of 1 nsec or less is used and the position, amplitude, or phase on the time axis of the pulse signal is changed to transmit information.

The frequency bandwidth that a UWB signal occupies is considerably wide over a range of 500 MHz to several GHz. As a result, high data-rate signal transmission or high-precision ranging is achieved because of use of a pulse signal having a considerably short time width of 1 nsec.

A radio communication scheme using the impulse-radio UWB enables the configuration of a transmitter/receiver to be simple, manufacturing costs to be kept low, and power consumption to be kept low.

CITATION LIST

Patent Literature

Patent Literature 1: JP 2015-61105 A

SUMMARY OF INVENTION

Technical Problem

In a case where the impulse-radio UWB is used, on-off keying (OOK) modulation based on on-off control of a pulse or pulse position modulation (PPM) modulation based on the position of the pulse is usually employed as basic processing, and a receiver needs to perform power detection in both cases.

On the receiver side, there is a need to perform processing of determining the presence or absence of the pulse, in a process of demodulating received data, and it is important to eliminate influence, such as noise or the variation of a received waveform, and to pick up only a target wave accurately.

Specifically, a received wave that the receiver receives includes noise in addition to the target wave, and the peak level of the received wave drastically varies, depending on propagation paths.

Thus, in order to prevent the noise from being wrongly determined as a signal pulse, it is considered that a threshold value for distinguishing the signal pulse and the noise is set high.

However, if the threshold value is set high, the receiver cannot detect the signal pulse in a case where the target wave is weak, and thus a degradation in receiving sensitivity occurs.

Thus, the present invention has been made in consideration of the problem described above, and an object of the present invention is to provide a radio receiver capable of improving receiving sensitivity while using a UWB.

Solution to Problem

A radio receiver according to a first aspect of the invention, is configured to use an impulse-radio UWB and includes: a reception antenna configured to receive the impulse-radio UWB; a reception unit configured to amplify the impulse-radio UWB received, the reception unit configured to perform detection of an envelope of the impulse-radio UWB; a maximum-peak detection unit configured to detect a maximum value of the envelope; a minimum-peak detection unit configured to detect a minimum value of the envelope; a comparator configured to acquire signal data from the envelope, with an initial threshold value; a baseband unit configured to measure an error rate of the signal data; a micro processing unit (MPU) configured to calculate a correction coefficient, based on the error rate; and an arithmetic unit configured to calculate a corrected threshold value, based on the maximum value, the minimum value, and the correction coefficient, the arithmetic unit configured to transmit the corrected threshold value to the comparator. The comparator acquires the signal data from the envelope, based on the corrected threshold value transmitted from the arithmetic unit.

According to a radio receiver of a second aspect of the invention, in the first aspect of the invention, the arithmetic unit performs arithmetic of Expression (1), based on the maximum value X, the minimum value Y, and the correction coefficient Z, calculates the corrected threshold value Vt, and transmits the corrected threshold value Vt to the comparator.

[Mathematical Formula 1]

$$Vt = \frac{X-Y}{Z} + Y \quad (1)$$

According to a radio receiver of a third aspect of the invention, in the first or second aspect of the invention, a bit error rate is used as the error rate, and the MPU calculates the correction coefficient, based on the bit error rate.

According to a radio receiver of a fourth aspect of the invention, in the first or second aspect of the invention, a packet error rate is used as the error rate, and the MPU calculates the correction coefficient, based on the packet error rate.

A radio receiver of a fifth aspect of the invention, in any one of the first to fourth aspects of the invention, further includes: a plurality of the reception units; and an adder configured to add the envelopes from the plurality of the reception units.

According to a radio receiver of a sixth aspect of the invention, in any one of the first to fifth aspects of the invention, the baseband unit measures the error rate per predetermined period.

Advantageous Effects of Invention

The present invention including the configurations described above, enables a radio receiver capable of improving receiving sensitivity while using an impulse-radio UWB, to be provided.

DESCRIPTION OF EMBODIMENTS

A radio receiver and a radio communication system according to an embodiment of the present invention, will be described below.

<Radio Receiver>

Figure 1:
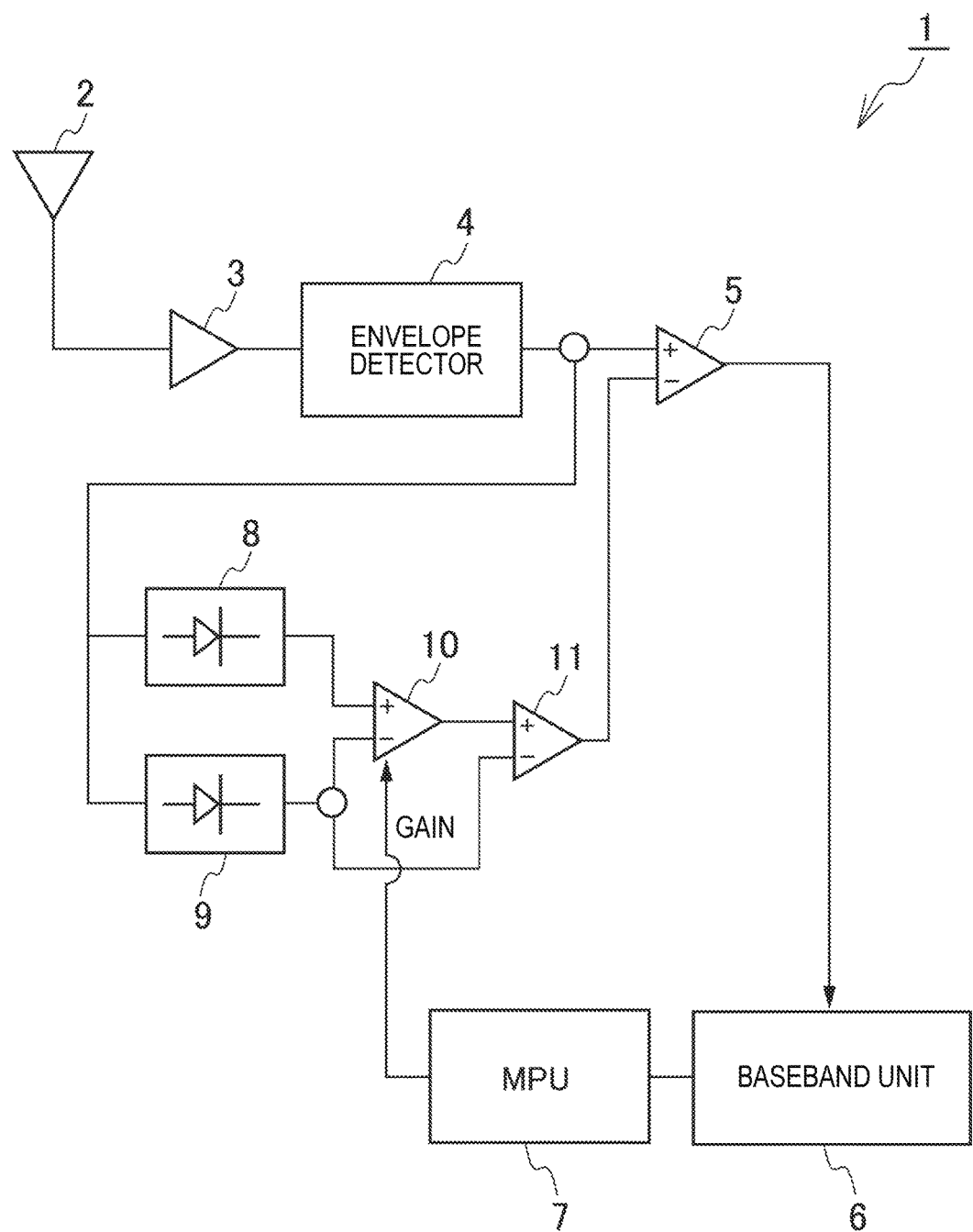
FIG. 1 is a block diagram of the system configuration of a radio receiver according to an embodiment of the present invention.

FIG. 1 is a block diagram of the system configuration of the radio receiver according to the embodiment of the present invention. The radio receiver 1 according to the present embodiment, includes an antenna 2, a low noise amplifier (LNA) 3, an envelope detector 4, a comparator 5, a baseband unit 6, a micro processing unit (MPU) 7, a maximum-peak detection unit 8, a minimum-peak detection unit 9, and arithmetic units 10 and 11 in two stages.

The antenna 2 receives an impulse-radio UWB transmitted from a transmitter.

For the impulse-radio UWB received through the antenna 2, the LNA 3 amplifies a UWB signal while suppressing noise superimposed in an amplification process.

On the basis of the envelope of the signal output from the LNA 3, the envelope detector 4 detects the amplitude in voltage of the signal. Note that, for convenience, the antenna 2, the LNA 3, and the envelope detector 4 are collectively defined as a reception unit.

The comparator 5 compares the signal strength in voltage detected by the envelope detector 4, to a predetermined threshold value. The comparator 5 determines that a target wave signal is present, for the signal strength that is equal to or larger than the threshold value, and determines that no target wave signal is present, for the signal strength that is smaller than the threshold value.

The baseband unit 6 demodulates received data, and then generates a digital signal with the state where the target wave signal is present set as 1 and the state where no target wave signal is present set as 0 in a detected result of the comparator 5. The baseband unit 6 provides the digital signal as output data for processing of a different device not illustrated. The modulation and demodulation for the transmission and reception of the data can be performed in any other schemes, and pulse density modulation and demodulation can be used as an example.

The baseband unit 6 measures the error rate of the received data. As the error rate to be measured, any error rate, such as a bit error rate or a packet error rate, can be adopted. The baseband unit can measure the error rate with any timing. For example, the measurement is performed at intervals of a predetermined plurality of packets.

The MPU 7 includes a control mechanism that controls the entire configuration of the radio receiver 1.

The maximum-peak detection unit 8 detects the maximum value in the envelope detected by the envelope detector 4 over a predetermined period. The maximum value in the envelope over the predetermined period, is denoted as X.

The minimum-peak detection unit 9 detects the minimum value in the envelope detected by the envelope detector 4 over the predetermined period. The minimum value in the envelope over the predetermined period, is denoted as Y.

The arithmetic unit 10 performs arithmetic of (X−Y)/Z. Here, Z represents a correction coefficient calculated by the MPU, the correction coefficient minimizing the error rate of the received signal.

The arithmetic unit 11 adds Y to an arithmetic result of the arithmetic unit 10.

That is the arithmetic units 10 and 11 perform arithmetic expressed by the following Expression (1) to calculate a corrected threshold value Vt.

[Mathematical Formula 1]

$$Vt = \frac{X-Y}{Z} + Y \quad (1)$$

Then, the corrected threshold value Vt calculated is transmitted to the comparator 5, so that the corrected threshold value Vt is supplied to the subsequent processing of the comparator 5.

Figure 2:
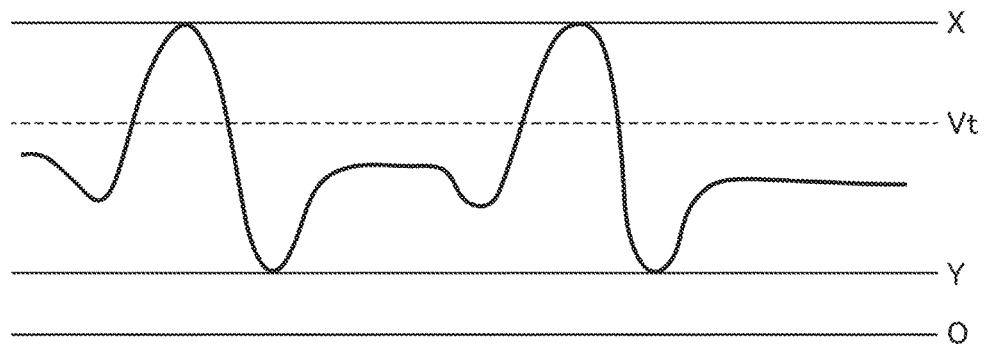
FIG. 2 is a graph of a detected waveform of the radio receiver.

FIG. 2 is a graph of a detected waveform of the radio receiver. FIG. 2 illustrates the relationship between Vt, X, and Y. The comparator 5 determines that the target wave signal is present, for a portion that is equal to or larger than the threshold value Vt in the envelope, and determines that no target wave signal is present, for a portion smaller than the threshold value Vt in the envelope.

Next, the operation of the radio receiver 1 having the configuration described above, will be described in detail.

First, the antenna 2 of the radio receiver 1 receives the impulse-radio UWB transmitted from the external radio transmitter, and transmits the impulse-radio UWB received to the LNA 3.

Next, the LNA 3 amplifies the impulse-radio UWB while suppressing the noise mixed with the impulse-radio UWB received by the antenna 2. For the impulse-radio UWB that is a feeble signal and is susceptible to the noise, this arrangement enables the signal to be detected precisely with the influence of the noise inhibited. Then, the LNA 3 transmits the impulse-radio UWB amplified to the envelope detector 4.

Next, the envelope detector 4 detects the amplitude in voltage of the signal, on the basis of the envelope of the signal output from the LNA 3. Then, the envelope detector 4 transmits the amplitude in voltage detected, to the comparator 5, the maximum-peak detection unit 8, and the minimum-peak detection unit 9.

Next, the comparator 5 compares the signal strength in voltage detected by the envelope detector 4, to the predetermined threshold value. The comparator 5 determines that the target wave signal is present, for the signal strength that is equal to or larger than the threshold value, and determines that no target wave signal is present, for the signal strength smaller than the threshold value, to generate the digital data.

Next, the baseband unit 6 demodulates the received data, and then generates the digital signal with the state where the target wave signal is present set as 1 and the state where no target wave signal is present set as 0 in the detected result of the comparator 5. The baseband unit 6 provides the digital signal as the output data for the processing of the different device not illustrated. The baseband unit 6 measures the error rate of the received data.

The measurement of the error rate is performed, for example, on the basis of a data correction rate performed to the received data or a result of error detection. However, the measurement of the error rate is not limited to this method, and thus may be performed in a different method.

The error rate measured by the baseband unit 6 is transmitted from the baseband unit 6 to the MPU 7.

Next, the MPU 7 calculates Z that minimizes the error rate of the received signal, on the basis of the error rate acquired by the baseband unit 6. The correction coefficient Z calculated is transmitted from the MPU 7 to the arithmetic unit 10.

Meanwhile, the maximum-peak detection unit 8 detects the maximum value X of the amplitude in voltage transmitted from the envelope detector 4, and transmits the maximum value X to the arithmetic unit 10.

The minimum-peak detection unit 9 detects the minimum value Y of the amplitude in voltage transmitted from the envelope detector 4, and transmits the minimum value Y to the arithmetic unit 10 and the arithmetic unit 11.

The arithmetic unit 10 performs the arithmetic of (X−Y)/Z with the maximum value X transmitted from the maximum-peak detection unit 8, the minimum value Y transmitted from the minimum-peak detection unit 9, and the correction coefficient Z transmitted from the MPU 7. The arithmetic result of the arithmetic unit 10 is transmitted from the arithmetic unit 10 to the arithmetic unit 11.

The arithmetic unit 11 performs the arithmetic of Expression (1) described above, with the arithmetic result of (X−Y)/Z of the arithmetic unit 10 and the minimum value Y detected by the minimum-peak detection unit 9, to calculate the corrected threshold value Vt.

The corrected threshold value Vt calculated in this manner, is transmitted from the arithmetic unit 11 to the comparator 5. The comparator 5 that has received the corrected threshold value Vt, performs the subsequent operation with the corrected threshold value Vt.

Then, a determined result for the presence or absence of the signal acquired by the comparator 5 with the corrected threshold value Vt, is transmitted to the baseband unit 6. After that, the radio receiver 1 calculates a new corrected threshold value Vt with second measurement of the error rate in a similar manner to the processing described above.

The radio receiver 1 according to the present embodiment adjusts the threshold value, corresponding to a communication situation, to enable a weak received wave to be detected. As a result, even in a case where the impulse-radio UWB is used, communication distance can be extended.

Note that the radio receiver 1 according to the embodiment described above includes the single reception unit, namely, the antenna 2, the LNA 3, and the envelope detector 4 on a one-by-one basis. However, the present invention is not limited to this, and thus a plurality of reception units may be provided.

In this case, an adder that adds the envelopes output from the plurality of reception units, is provided between the reception units and the comparator 5.

The provision of the adder in this manner allows the power of the impulse-radio UWB received by the plurality of reception units to increase theoretically in accordance with the number of reception units. This arrangement enables the received power of the impulse-radio UWB to increase, so that longer-haul radio communication can be achieved than ever before.

REFERENCE SIGNS LIST

1 radio receiver
2 antenna
3 low noise amplifier (LNA)
4 envelope detector
5 comparator
6 baseband unit
7 micro processing unit (MPU)
8 maximum-peak detection unit
9 minimum-peak detection unit
10, 11 arithmetic unit
FIG. 1
4 ENVELOPE DETECTOR
6 BASEBAND UNIT
GAIN

The invention claimed is:

1. A radio receiver configured to use an impulse UWB, the radio receiver comprising:
a reception antenna configured to receive the impulse UWB;
a reception unit configured to: amplify the received impulse UWB, and perform detection of an envelope of the impulse UWB;
a maximum-peak detection unit configured to detect a maximum value of the envelope;
a minimum-peak detection unit configured to detect a minimum value of the envelope;
a comparator configured to acquire signal data from the envelope with an initial threshold value;
a baseband unit configured to measure an error rate of the signal data;
an MPU configured to calculate a correction value based on the error rate; and
an arithmetic unit configured to: calculate a corrected threshold value based on the maximum value, the minimum value, and the correction value, and to transmit the corrected threshold value to the comparator,
wherein the comparator acquires the signal data from the envelope based on the corrected threshold value transmitted from the arithmetic unit.

2. The radio receiver according to claim 1, wherein the arithmetic unit performs arithmetic of Expression (1), based on the maximum value X, the minimum value Y, and the correction value Z, calculates a corrected threshold value Vt, and transmits the corrected threshold value Vt to the comparator

[Mathematical Formula 1]

$$Vt = \frac{X-Y}{Z} + Y. \quad (1)$$

3. The radio receiver according to claim 2, wherein a bit error rate is used as the error rate, and the MPU calculates the correction value based on the bit error rate.

4. The radio receiver according to claim 3, further comprising:
a plurality of the reception units; and
an adder configured to add the envelopes from the plurality of the reception units.

5. The radio receiver according to claim 3, wherein the baseband unit measures the error rate per a predetermined period.

6. The radio receiver according to claim 2, wherein a packet error rate is used as the error rate, and the MPU calculates the correction value based on the packet error rate.

7. The radio receiver according to claim 6, further comprising:
a plurality of the reception units; and an adder configured to add the envelopes from the plurality of the reception units.

8. The radio receiver according to claim 6, wherein the baseband unit measures the error rate per a predetermined period.

9. The radio receiver according to claim 2, further comprising:
a plurality of the reception units; and
an adder configured to add the envelopes from the plurality of the reception units.

10. The radio receiver according to claim 9, wherein the baseband unit measures the error rate per a predetermined period.

11. The radio receiver according to claim 2, wherein the baseband unit measures the error rate per a predetermined period.

12. The radio receiver according to claim 1, wherein a bit error rate is used as the error rate, and the MPU calculates the correction value based on the bit error rate.

13. The radio receiver according to claim 12, further comprising:
a plurality of the reception units; and
an adder configured to add the envelopes from the plurality of the reception units.

14. The radio receiver according to claim 12, wherein the baseband unit measures the error rate per a predetermined period.

15. The radio receiver according to claim 1, wherein a packet error rate is used as the error rate, and the MPU calculates the correction value based on the packet error rate.

16. The radio receiver according to claim 15, further comprising:
a plurality of the reception units; and
an adder configured to add the envelopes from the plurality of the reception units.

17. The radio receiver according to claim 15, wherein the baseband unit measures the error rate per a predetermined period.

18. The radio receiver according to claim 1, further comprising:
a plurality of the reception units; and
an adder configured to add the envelopes from the plurality of the reception units.

19. The radio receiver according to claim 18, wherein the baseband unit measures the error rate per a predetermined period.

20. The radio receiver according to claim 1, wherein the baseband unit measures the error rate per a predetermined period.

* * * * *